US012697549B2

(12) United States Patent
Cockram et al.

(10) Patent No.: US 12,697,549 B2
(45) Date of Patent: Aug. 4, 2026

(54) CONTENT EVALUATION SYSTEM AND METHOD

(71) Applicant: Sony Interactive Entertainment Inc., Tokyo (JP)

(72) Inventors: Philip Cockram, London (GB); Peter Garner, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 261 days.

(21) Appl. No.: 18/452,102

(22) Filed: Aug. 18, 2023

(65) Prior Publication Data

US 2024/0066407 A1 Feb. 29, 2024

(30) Foreign Application Priority Data

Aug. 26, 2022 (GB) ..................................... 2212458

(51) Int. Cl.
*A63F 13/67* (2014.01)
*A63F 13/45* (2014.01)
(Continued)

(52) U.S. Cl.
CPC .............. *A63F 13/67* (2014.09); *A63F 13/45* (2014.09); *A63F 13/52* (2014.09); *A63F 13/53* (2014.09);
(Continued)

(58) Field of Classification Search
None
See application file for complete search history.

(56) References Cited

U.S. PATENT DOCUMENTS

2017/0171614 A1* 6/2017 el Kaliouby ........... G16H 50/70
2018/0011682 A1* 1/2018 Milevski ................ A63F 13/47
(Continued)

FOREIGN PATENT DOCUMENTS

EP 2836277 A1 2/2015
KR 20200048637 A1 5/2020
WO 2020072364 A1 4/2020

OTHER PUBLICATIONS

Extended European Search Report for corresponding EP Application No. 23191655.2, 13 pages, dated Jan. 8, 2024.
(Continued)

*Primary Examiner* — Jason T Yen
(74) *Attorney, Agent, or Firm* — Kilpatrick Townsend & Stockton LLP

(57) ABSTRACT

Digital content such as games, movies, or interactive media can be evaluated based on cognitive load experienced by users. Evaluation begins with collecting diverse data including metadata, gameplay metrics, user feedback, and the analysis of visual or audio extracts. Information about content length, scope, asset variety, and user interaction patterns is processed using models that consider both general and user-specific factors. These models assess the contributions of individual content properties to overall mental effort, producing values that, for example, relate to complexity. Results may be presented through ranked lists, indicators of user suitability, or suggestions for engagement duration. The approach enables users to select content that matches their preferences and capacities, which can improve satisfaction and streamline navigation and resource use. This evaluation framework also informs device compatibility by relating cognitive demands to hardware features, which can result in enhanced user experience and more efficient allocation of digital resources.

14 Claims, 2 Drawing Sheets

(51) Int. Cl.

| | |
|---|---|
| *A63F 13/52* | (2014.01) |
| *A63F 13/53* | (2014.01) |
| *A63F 13/60* | (2014.01) |
| *A63F 13/79* | (2014.01) |
| *G06F 3/01* | (2006.01) |

(52) U.S. Cl.
CPC .............. *A63F 13/60* (2014.09); *A63F 13/79* (2014.09); *G06F 3/011* (2013.01); *G06F 3/015* (2013.01); *A63F 2300/8082* (2013.01); *G06F 2203/011* (2013.01)

(56) References Cited

U.S. PATENT DOCUMENTS

| | | | |
|---|---|---|---|
| 2018/0161626 A1* | 6/2018 | Fung ..................... | G09B 19/00 |
| 2019/0392604 A1* | 12/2019 | Keen ..................... | A63F 13/215 |
| 2024/0070990 A1* | 2/2024 | Grant ................... | A63F 13/212 |

OTHER PUBLICATIONS

Combined Search and Examination Report for corresponding GB Application No. 2212458.0, 7 pages, dated Jan. 24, 2023.
EP23191655.2, "Office Action", Dec. 12, 2025, 9 pages.

* cited by examiner

Data Obtaining Unit

300

Processing Unit

310

Evaluation Unit

320

Image Generation Unit

330

Obtain data

400

Determine expected contribution

410

Determine cognitive load

420

Generate image for display

430

CONTENT EVALUATION SYSTEM AND METHOD

BACKGROUND OF THE INVENTION

Field of the Invention

This disclosure relates to a content classification system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Over time, gaming has become an increasingly accessible and appealing pastime for many people; this has led to an increasing adoption of gaming in recent years. This is partially driven by the availability of devices that enable a user to play games—for instance, many people own a mobile phone that can enable a user to play games. The availability of cloud gaming applications has also reduced a technological burden upon many users, as it can enable games to be played even from devices that do not have significant processing power. In addition to this, the increase in the processing power of dedicated gaming consoles has led to the development of increasingly immersive and visually appealing content which can increase interest in interacting with such content.

In line with this, the amount of content that is available to users has also increased; increased demand and market size may be a driver of this, as well as access to tools which can simplify many aspects of the content creation process. There is therefore a significant amount of content available to a user, and this content may vary substantially in a number of different ways. For instance, content may correspond to any of a number of different genres (such as sci-fi or western), comprise a number of different mechanics (such as first-person shooter or real-time strategy), and have very different scopes (such as a short and casual game, or a long and involved game).

While a user may be able to determine one or more of these characteristics about a particular piece of content based upon images or tags associated with the content, this may be inaccurate and/or misleading. For instance, one player may tag a game as being 'short' while another player considers it to be 'long' due to varying expectations of how long gameplay should take or varying lengths of game sessions between users. For example, a user that routinely plays games for six hours at a time may consider a game casual, whilst a user that usually only plays for an hour may consider it to be less casual as the same investment in recalling their position in the game and how to play or the like is rewarded with less play time. This can make it difficult for a user to select content, as their expectations may not align with the actual characteristics of the content.

While other sources may provide more detailed information about characteristics of content, such as in-depth reviews, these are far less accessible to the user and require a significant effort by the user to consume and process this information to derive a conclusion about the content. It is therefore considered that many users would not consider such sources to be a useful source of information, and as such the user is not able to make an informed decision as to which content to select.

It is therefore apparent that objective and easy-to-obtain information about content would be considered advantageous by a user It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
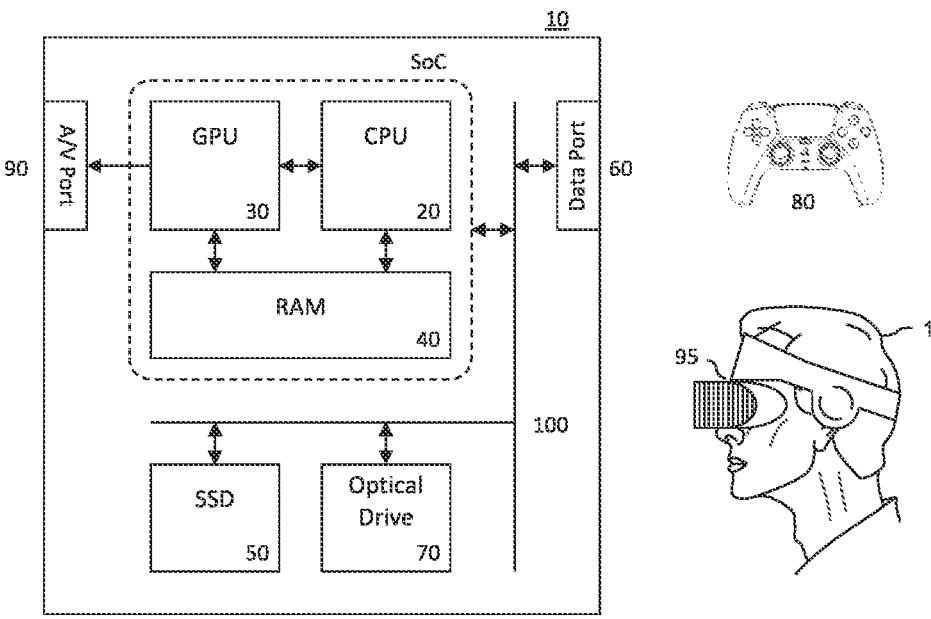
FIG. 1 schematically illustrates an example of an entertainment system.

Referring now to the drawings, wherein like reference numerals designate identical or corresponding parts throughout the several views, embodiments of the present disclosure are described.

Referring to FIG. 1, an example of an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, Wi-Fi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

Embodiments of the present disclosure seek to provide a characterisation of content in dependence upon the cognitive load of the content. The cognitive load may be based upon the complexity of the content and/or one or more mental requirements placed upon a user by the content; throughout this description the terms complexity and cognitive load are used interchangeably. This can therefore be considered a measure of the amount of concentration required (and in some cases, a duration for which the concentration is required) by the content to achieve a particular level of engagement or success, and/or a measure of the amount of information that the user is required to remember and/or process in order to achieve this level of engagement or success. This can apply to any type of content, rather than just games—for instance, a movie or a book may be considered complex if there are a lot of different plot threads to follow (requires a lot of concentration) and there are a lot of characters (a lot of information to remember and process).

For example, a low-complexity game would be one in which the game mechanics are simple and in which there is very little game-specific information required to play; this may include a limited number of characters and/or a reduced amount of backstory providing context for the game. An example of this would be a generic match-three style game in which there is no additional storyline or the like. Contrastingly, an example of a high-complexity game is a 4× game (eXplore, eXpand, eXploit, eXterminate) in which a user may be presented with a large map, a number of different playable factions each comprising a number of unique units, potentially a number of game mechanics, high levels of strategy, tactical considerations, and a degree of competition that is not found in a match-three game. This therefore clearly requires a higher degree of knowledge and concentration than the low-complexity example; while a user could play such a game without concentrating or background knowledge, they would find it extremely difficult to reach any reasonable level of performance.

It is therefore considered that while the complexity of a game may be measured in dependence upon a particular level of concentration or knowledge associated with a game, this may not be prohibitive of the game being played. The complexity may therefore be measured based upon a minimum required to complete the game (or pass some other progress-related checkpoint), a level associated with the performance of an average player, or simply the amount required were the user to attempt to understand and engage with every element in a game.

Certain game-specific parameters may also be considered in determining the complexity independent of the user's level of performance when seeking to play the game; it is therefore considered that a measure of the complexity of content may be determined without any user input or direct consideration of the user.

Figure 2:
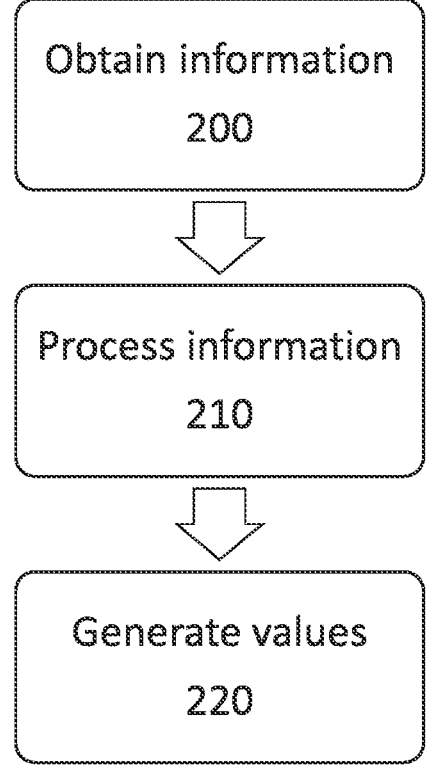
FIG. 2 schematically illustrates a method for measuring of the complexity of content.

FIG. 2 schematically illustrates a method for generating a measure of the complexity of content in accordance with one or more embodiments of the present disclosure.

A step 200 comprises obtaining information about the content; this information may be obtained from the content itself (such as metadata or tags associated with the content), from a server comprising content information, user input relating to the content, and/or from feedback from a number of previous users of the content. This information may be obtained from any source, and the information may relate to any particular characteristic of the content and/or user of the content as appropriate. A number of non-limiting examples are provided throughout the present disclosure, each of which may be utilised independently or in combination with other examples (and/or other information not specifically described as an example in the present disclosure).

A first example of such information is that of the length of the content. This may be determined from an evaluation of the content or from metadata associated with the content. In the case of a video, the length is simply the duration of the content, while in the case of a game or other interactive content the length may be determined based upon reports by prior users (such as an average play time of users who have finished the game) for example. Alternatively, or in addition, the length may be estimated in dependence upon information about the game such as a number of levels/stages or a total size of the virtual environment, a number of quests, or any other information.

A second example is that of the scope or scale of the content; in alternative terminology, this can be considered a measure of how much depth or weight there is to the content. While this may be defined by the content itself or data associated with the content (such as a user rating of the content), in some embodiments this may instead be generated based upon an analysis of the content. For instance, the scope can be estimated based upon a number of game assets associated with a game as this can be indicative of how much information the user may be required to recall or process during playing of a game. For example, a game which has a large number of interactive objects may be considered more complex than one which has fewer interactive objects as it can be assumed that the user would need to remember how each of those interactions works in order to achieve a reasonable level of success in the game; similarly, a game with a large map size (such as an open world game) may have a cognitive load than a game with a smaller map size or more constraints on movement (such as a two-dimensional game versus a three-dimensional). The number of assets could also be considered on a per-level basis, for example, to indicate how frequently and how significantly the content changes—higher changes being associated with a higher cognitive load. A further example of a measure of the weight of the content is that of an average or maximum inventory size, as it may be considered that the cognitive load scales with the number of items carried by a user during a game, for instance.

Another example is that of screenshots or other extracts of the content (such as audio clips, game logs, or event notifications). These can be analysed to identify a complexity based upon a number of different metrics. For instance, a number of objects (and/or unique objects) on screen at once can be indicative of the complexity of the content as can the amount of motion of those objects (as more static objects can be considered to place less of a burden upon the user's focus). Similarly, a number of events occurring in a given period of time can be indicative of a processing burden upon the user in that they will be expected to identify the events and react to them; content with fewer events can often be interacted with by a user with minimal concentration. Audio which has a large number of sound sources emitting sounds at the same time can also be indicative of a greater complexity of the content, for example, as can audio which indicates sounds being emitted from a number of different directions; in either case, the user would be required to concentrate more to understand the salient parts of the audio.

A further example is that of interaction data for a user's previous interactions with the content or other users (such as an average user or a representative group of users). In such cases, information about the number of inputs in a given time can be taken to be indicative of complexity—content with a lower number of inputs per unit time will be expected to be a lower complexity than content with a higher number of inputs per unit time. While this may not be a direct correlation, as some simple games can require a high input rate, this can still be taken to be indicative of complexity when context is provided using other information.

Other information may include any of those described here as examples, for instance, or characterising information associated with the inputs directly. For example, information about the range of inputs provided (such as different combinations of inputs) and the sensitivity of the timing of the inputs may be considered, as well as information about how hard button presses were when providing the inputs. For instance, the cognitive load may be considered to be greater for a content when the number of different inputs is increased (such as using all of the buttons on an input device rather than only a small number of them). Similarly, the greater the number of combination inputs that are used (such as pressing two or three buttons simultaneously) and their complexity may also be indicators of a cognitive load associated with the content, as this can place a greater operational and memory burden upon the user. The cognitive load may also be considered to vary in dependence upon how these inputs change over time—changing inputs (that is, a greater variety of inputs used over time) may be indicative of greater variation of the content, and thus an increased amount of concentration being required. The amount of variation and/or the time period over which the variation occurs may both contribute to the assessment of cognitive load in this context.

Gameplay metrics may be considered to be another example of useful information in this context; metrics may include an average success rate of players of a game (or a portion of a game), the average level of focus of a user with the content (for instance, based upon gaze tracking), time spent on a particular task or in a particular location, and/or the average progress of a user during a gameplay session. Combinations of these metrics may be particularly useful in determining the cognitive load, even if an individual metric is not conclusive. For example, if the average level of focus is high but the average progress and success rate are low then this can indicate that the cognitive load is high. Information about a user's prior experience with particular content or related content (such as a prequel/sequel/spinoff game) may also be considered to factor into the perceived complexity of the content.

Users may also be able to provide feedback about content to provide a further source of information that may be considered. This may be specific to the user for which the cognitive load is being developed, or aggregate information may be provided that is representative of the entire player base or a portion thereof. For instance, players of a specific age range, native language, experience level, or any suitable demographic may be considered a suitable portion.

In some cases this user feedback may be a single numerical rating or selection of a label based upon the cognitive load they experienced when interacting with the content or their opinion on the complexity of the content. This feedback can then be consolidated into a single representative rating, for instance, which is associated with the content as metadata. Alternatively, or in addition, users may be provided with the tools to provide a more detailed feedback; this may include the provision of feedback for a number of different aspects of the content or user experience.

An example of this is the NASA-TLX tool, which provides a framework for a user to give feedback on the mental workload that they have experienced. The mental workload comprises an assessment mental demand, physical demand, temporal demand, effort, performance, and frustration level. Each of these may be considered to be aspects of the cognitive load as referenced in the present disclosure. This tool can be used to rate the content as a whole (such as an entire movie or game) or portions of content (such as specific stages, tasks, or scenes). The results of this analysis (that is, the ratings submitted by users) can be weighted appropriately and a workload score can be calculated which is indicative of the cognitive load associated with the content. This calculation may be performed in accordance with the TBRS (time-based resource-shared) model, in some embodiments.

While the cognitive load/complexity has been described in terms of a single value, it is considered that there may be a temporal element to these. This means that content can be differentiated between based upon an overall cognitive load, a peak cognitive load, how sustained the cognitive load is, and what the cognitive load is for a particular portion of the content (such as for the levels of a game that the user would encounter during a typical play session, based upon their current progress in the game and a measure of an average or expected play session duration).

A step 210 comprises processing the obtained information to identify a contribution of the information to the complexity of the content. This may be performed in accordance with a predetermined model, for instance, which weights various factors based upon their contribution to the complexity of the content or the cognitive load experienced by the user. Such a model may be provided on a per-user basis, as different users may experience cognitive load based upon different features of content to others or in differing amounts—this may be based upon a natural aptitude for particular tasks, for example, or previous experience with similar content. Alternatively, or in addition, models may be provided on a per-game, per-series (that is, for a related set of games), per-genre, per-device (such as for a particular games console), and/or per-language basis. It is envisaged that a number of these factors may be combined, such that an exemplary model could be provided for English-speaking PlayStation® players of iterations seven to ten of 'Sports Game'.

In some cases the model may have a time-based dependency which varies the weightings according to either or both of a time spent interacting with the content and a time since a user last interacted with the content. For instance, as a user spends more time playing a game they may become more familiar with the mechanics and as such these will cause a reduced cognitive load; however the same would not necessarily be true of a reliance upon reflexes, which would be equally taxing despite the increased experience. Similarly, increased time not playing a game would lead to some weightings increasing substantially (such as remembering particular crafting recipes) whilst others would be relatively unchanged (such as remembering key characters).

Appropriate weightings may be predetermined by a developer of a model, for instance, or may be identified using a machine learning model that is trained based upon a training data set comprising content that is labelled with user feedback relating to the cognitive load associated with the content and/or one or more parameters of the content. Alternatively, or in addition, a user may be able to indicate particular aspects of content that generate a high cognitive load for them so as to generate a model. The user indication may be in the form of sliders or scores associated with particular content characteristics (such as number of unique objects, intensity, or duration) and/or characteristics which indicate user burdens (such as reliance on memory, reliance on reflexes, and/or reliance on focus for success).

A step 220 comprises generating one or more values indicating a complexity of the content. These values may include an overall scoring of the complexity of content or the cognitive load associated with it, as well as (or instead of) a number of scores for particular aspects of the cognitive load associated with the content. These values may be presented to a user during a content selection process, and/or used to rank content based upon an associated cognitive load or a complexity. In some embodiments the values may be selected so as to indicate a perception complexity (based upon how 'busy' the display screen is, for example) and/or processing complexity. In some embodiments it is considered that content lists may be filtered based upon suitability for a particular user and content reproduction system pairing such that unsuitable content is omitted from a list.

By providing such information to a user, they are able to make a more informed decision when selecting content which can lead to higher user satisfaction. This improvement is also associated with a reduction of a burden upon content providing servers; users are better able to identify relevant content (thereby reducing the amount of time spent navigating an online store, for example) and are likely to download less content due to being able to make a better selection (in other words, the chance of a user downloading two or more content items to find a suitable content is reduced).

In addition to this, by providing a user and/or device with such information a more appropriate selection can be made—content associated with a higher cognitive load may be associated with a need for a higher processing power (due to a larger map size or number of objects, for instance), a desire for a reduced latency (due to time pressures when making decisions, for instance) which can mean playing offline or with an improved network connection, and/or a user desire for a larger display (due to this making it easier to distinguish visual elements on the display). Each of these parameters may be used to determine a suitability of the content for use with a particular device. These differ from system requirements in that they are based upon user perception and cognitive load, rather than objective system performance—and therefore can differ from person to person, unlike the minimum and recommend system specifications that are currently used for describing games. It is therefore considered that while these considerations may be user-dependent, there is an objective improvement in the user experience when considering the cognitive load and the constraints that these place upon a system for providing the content due to the fact that the user's needs are explicitly addressed.

Figures 3, 4:
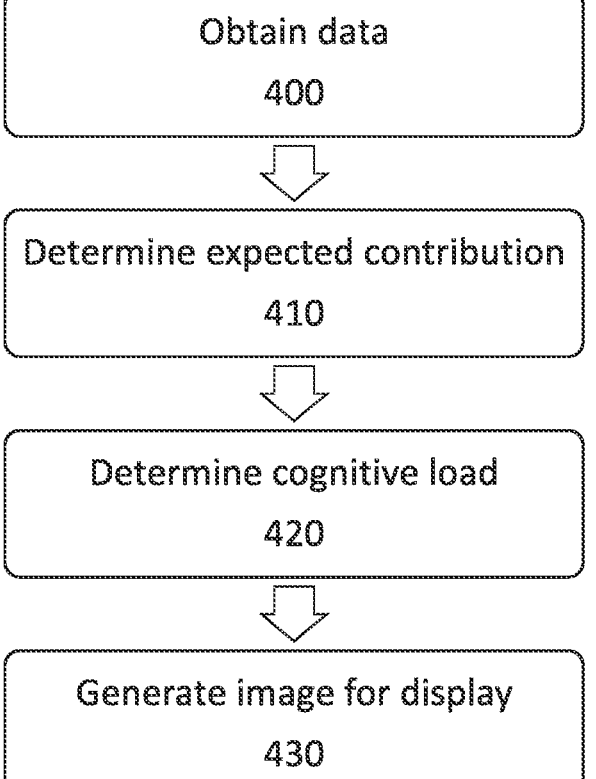
FIG. 3 schematically illustrates a system for evaluating content and generating image content for display.
FIG. 4 schematically illustrates a method for evaluating content and generating image content for display.

FIG. 3 schematically illustrates a system for evaluating content and generating one or more images for display in dependence upon this evaluation; this content may be video, audio, or video game content, for instance. The system comprises a data obtaining unit 300, a processing unit 310, an evaluation unit 320, and an image generation unit 330. These functional units may be implemented using any suitable configuration of processing elements, and may be distributed amongst a number of different processors and devices as appropriate. For instance, each of the units may be implemented using a processor located at a server or games console; alternatively, a number of features of these units may be implemented at a server while others are implemented at a games console or personal computer, for example.

The data obtaining unit 300 is configured to obtain data relating to one or more properties of the content. As is apparent from the above discussion, the obtained data may include a wide range of information about the content and/or how the user engages with the content. Here, properties may include information about the mechanics of a game, a genre, a duration, a level of intensity, or any other characteristic of the content.

For example, the obtained data may comprise user-generated feedback relating to the content; this can include user-generated tags or ratings relating to the complexity of the content of the cognitive load associated with the content. This feedback may be specific to a user (such as a user providing their own feedback for future reference), and/or may include feedback from other users of the content (such as other players of a game).

In some embodiments the obtained data comprises gameplay metrics for one or more users. This may include information about success rates of a user, number of retries/repeats of segments of the content, time spent playing a game or interacting with content or particular portions of the content, user focus or frustration experienced while interacting with the content, or any other metric which characterises a user's interaction with the content.

In some embodiments the obtained data relates to information about the files associated with the content or the like. For instance, the obtained data may comprise information about a number of assets associated with the content, such that the processing unit 310 can be configured to determine an expected contribution in dependence upon at least total number of assets or a number of unique assets. Similarly, information about map sizes, number of characters, inventory sizes, or any other characteristic of the content may be considered in line with the above discussion.

Rather than analysing game files or relying on user feedback, the obtained data may instead (or additionally) comprise one or more screenshots and/or videos of the content, such that the processing unit 310 can be configured to identify at least a number of objects displayed in a scene in dependence upon the screenshots and/or videos. Any other data can also be derived from the screenshots and/or videos, such as information about the number of events in the content and the motion of elements within the content. Similar information may also be derived from audio samples of the content, based upon the number of sound sources identified and their relative locations/motion within the sample.

The processing unit 310 is configured to determine an expected contribution of one or more of the properties to a cognitive load for a user. As discussed above, this may utilise a pre-defined model or the like in order to generate an appropriate weighting and/or representation of the contributions—this model being user-specific in some cases, or a more general model to represent a number of users in others. Such a model may score different features (such as genre or game mechanics) to represent a contribution of those features to the overall complexity of the content or the cognitive load associated with the content, with a weighting being applied to these to represent how significant an impact those factors have on the overall impression of the user in respect of the cognitive load. The functionality of the processing unit 310 in determining contributions may be provided in accordance with the discussion of step 210 of FIG. 2, for example.

The evaluation unit 320 is configured to determine an expected cognitive load associated with the content in dependence upon the expected contributions. The evaluation unit 320 may be configured to determine the expected cognitive load for the entire content or a particular portion of the content, such as a particular level or a segment of content starting from a user's save game state, for example. Other examples of portions of the content include particular tasks or challenges that may be undertaken by a user, such as in-game objectives, particular game modes, or groups of levels.

In some embodiments, the evaluation unit 320 may be configured to determine a change in expected cognitive load throughout at least a portion of the content; this can be a comparison of the cognitive loads associated with successive levels or scenes in the content, for example, or an indication of the expected cognitive load associated with different levels of progress or elapsed time within the content.

In some embodiments, the evaluation unit 320 may be configured to determine the expected cognitive load in dependence upon a user's time spent using the content and/or a time since the user last used the content. The expected cognitive load may decrease as a user progresses further with the content, due to increased familiarity, while the expected cognitive load may increase with time spent not interacting with the content due to forgetting things about the content (such as crafting recipes), for example.

In some embodiments, the processing unit 310 and/or evaluation unit 320 are configured to perform a determination in dependence upon the user profile of a particular user for whom the image for display is generated, wherein the user profile comprises information about user content preferences and/or experience with other content. For instance, the user profile could comprise information about a preferred genre and experience with sequel or prequel games—either of these may reduce the cognitive load associated with content as the user's prior knowledge and/or experience would aid them in understanding the content and how they can interact with it.

The image generation unit 330 is configured to generate an image for display in dependence upon the determined expected cognitive load. In some embodiments this can include displaying a particular value or values corresponding to the expected cognitive load, while in others the display of content is modified in dependence upon this without requiring an explicit display of these values.

In some embodiments, the generated image comprises a ranked list of content ordered according to an expected cognitive load. This may be useful in the context of a user viewing their personal content library, for example, or when viewing content in an online store; in such a case, contents may be sorted (and/or filtered) according to a desired level of cognitive load for a user. For instance, a list could be sorted from highest cognitive load to lowest in the case that the user desires a more engaging or challenging experience, or from lowest to highest in the case that the user desires a more relaxed experience or is using a content reproduction system having limited capabilities. Similarly, a filtering may be performed in accordance with any other parameters (such as available time) to generate a recommendation (or a shortlist) of content for the user to interact with.

Alternatively, or in addition, the generated image may comprise a suggested maximum time for the user to interact with the content in dependence upon the expected cognitive load. This may be calculated based upon a user profile or other input from the user indicating their cognitive budget or capacity; in other words, this can be an estimate of how long the user should or could play without risking burn out or the like from concentrating for too long.

As a further alternative or additional variation, the generated image may comprise an indication of the suitability of the content for the system displaying the image in dependence upon the expected cognitive load. In line with the above discussion, information about the system can be gathered such as a display size, a display refresh rate, processing power, whether the system can output directional audio, and what inputs the system can receive (such as which buttons/joysticks are available and their functionality); this information can then be used as an indicator for whether the cognitive load would be too high for that hardware arrangement to enable a satisfactory user experience. This is in view of the fact that with limited inputs/outputs the user may be unable to interact with the content in a sufficiently detailed manner so as to be able to cope with the complexity.

The arrangement of FIG. 3 is an example of a processor (for example, a GPU and/or CPU located in a games console or any other computing device) that is operable to evaluate content, and in particular is operable to: obtain data relating to one or more properties of the content; determine an expected contribution of one or more of the properties to a cognitive load for a user; determine an expected cognitive load associated with the content in dependence upon the expected contributions; and generate an image for display in dependence upon the determined expected cognitive load.

FIG. 4 schematically illustrates a method for evaluating content so as to determine an expected cognitive load associated with that content, and to generate an image for display in accordance with that determination. This method may be performed in accordance with the discussion of the corresponding system as described with reference to FIG. 3.

A step 400 comprises obtaining data relating to one or more properties of the content; this data may relate to any aspect of the content, and may include information derived from game files, metadata associated with the content, user profile information, and/or screenshots, video, and/or audio samples of the content.

A step 410 comprises determining an expected contribution of one or more of the properties to a cognitive load for a user. This contribution is a measure of the burden placed upon the user when presented with that property. An example of this is in the mechanics of a game; a match-three game would be associated with a low expected contribution due to simplicity, while a 4× game would be associated with a much higher expected contribution due to having a number of interlinking mechanics that must each be balanced with one another.

A step 420 comprises determining an expected cognitive load associated with the content in dependence upon the expected contributions. This expected cognitive load comprises one or more values that are representative of the overall burden that a particular content places upon a user of that content. This may be a single value, such as a numerical ranking or a tag (such as 'low', 'medium', or 'high'), or a number of them to indicate different aspects of the cognitive load. Examples of aspects of a cognitive load may include mental demand, physical demand, temporal demand, effort, performance, and frustration level.

A step 430 comprises generating an image for display in dependence upon the determined expected cognitive load. This image may include a representation of the cognitive load, for example, or may include modifying the display in dependence upon the expected cognitive load (such as generating a ranked list of content without displaying the values themselves).

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A system for evaluating content, the system comprising: a data obtaining unit configured to obtain data relating to one or more properties of the content; a processing unit configured to determine an expected contribution of one or more of the properties to a cognitive load for a user; an evaluation unit configured to determine an expected cognitive load associated with the content in dependence upon the expected contributions; and an image generation unit configured to generate an image for display in dependence upon the determined expected cognitive load.

2. A system according to clause 1, wherein the obtained data comprises user-generated feedback relating to the content.

3. A system according to any preceding clause, wherein the obtained data comprises gameplay metrics for one or more users.

4. A system according to any preceding clause, wherein the obtained data comprises information about a number of assets associated with the content, wherein the processing unit is configured to determine an expected contribution in dependence upon at least total number of assets or a number of unique assets.

5. A system according to any preceding clause, wherein the obtained data comprises one or more screenshots and/or videos of the content, and wherein the processing unit is configured to identify at least a number of objects displayed in a scene in dependence upon the screenshots and/or videos.

6. A system according to any preceding clause, wherein the processing unit and/or evaluation unit are configured to perform a determination in dependence upon the user profile of a particular user for whom the image for display is generated, wherein the user profile comprises information about user content preferences and/or experience with other content.

7. A system according to any preceding clause, wherein the generated image comprises a ranked list of content ordered according to an expected cognitive load.

8. A system according to any preceding clause, wherein the generated image comprises a suggested maximum time for the user to interact with the content in dependence upon the expected cognitive load.

9. A system according to any preceding clause, wherein the generated image comprises an indication of the suitability of the content for the system displaying the image in dependence upon the expected cognitive load.

10. A system according to any preceding clause, wherein the evaluation unit is configured to determine the expected cognitive load for the entire content or a particular portion of the content.

11. A system according to any preceding clause, wherein the evaluation unit is configured to determine a change in expected cognitive load throughout at least a portion of the content.

12. A system according to any preceding clause, wherein the evaluation unit is configured to determine the expected cognitive load in dependence upon a user's time spent using the content and/or a time since the user last used the content.

13. A method for evaluating content, the method comprising: obtaining data relating to one or more properties of the content; determining an expected contribution of one or more of the properties to a cognitive load for a user; determining an expected cognitive load associated with the content in dependence upon the expected contributions; and generating an image for display in dependence upon the determined expected cognitive load.

14. Computer software which, when executed by a computer, causes the computer to carry out the method of clause 13.

15. A non-transitory machine-readable storage medium which stores computer software according to clause 14.

The invention claimed is:

1. A system for evaluating content, the system comprising:

a display;

one or more processors; and one or more computer-readable media collectively having stored thereon computer-executable instructions that, when executed with the one or more processors, collectively cause the system to, at least:

obtain data relating to one or more properties of the content;

determine an expected contribution of the one or more properties to a cognitive load for a user, the cognitive load corresponding to a measure of complexity of the content and individual expected contributions corresponding to a complexity score;

determine an expected cognitive load associated with the content in dependence upon a weighted combination of individual complexity scores corresponding to the individual expected contributions;

generate an image for display in dependence upon the determined expected cognitive load, the image comprising an indication of a value of the determined expected cognitive load; and cause the image to be presented to the user with the display.

2. The system of claim 1, wherein the obtained data comprises user-generated feedback relating to the content.

3. The system of claim 1, wherein the obtained data comprises gameplay metrics for one or more users.

4. The system of claim 1, wherein the obtained data comprises information about a number of assets associated with the content, and at least one complexity score is determined in dependence upon at least a total number of assets or a number of unique assets.

5. The system of claim 1, wherein the obtained data comprises one or more screenshots and/or videos of the content, and at least one complexity score is determined in dependence upon a number of objects displayed in a scene of the screenshots and/or videos.

6. The system of claim 1, wherein at least one complexity score is determined in dependence upon a user profile of a particular user for whom the image for display is generated, wherein the user profile comprises information about user content preferences and/or experience with other content.

7. The system of claim 1, wherein the generated image comprises a ranked list of content ordered according to an expected cognitive load.

8. The system of claim 1, wherein the generated image comprises a suggested maximum time for the user to interact with the content in dependence upon the expected cognitive load.

9. The system of claim 1, wherein the generated image comprises an indication of the suitability of the content for the system displaying the image in dependence upon the expected cognitive load.

10. The system of claim 1, wherein the expected cognitive load is determined for a particular portion of the content.

11. The system of claim 1, wherein the expected cognitive load varies throughout at least a portion of the content.

12. The system of claim 1, wherein the expected cognitive load is determined in dependence upon a user's time spent using the content and/or a time since the user last used the content.

13. A method for evaluating content, the method comprising:

obtaining data relating to one or more properties of the content;

determining an expected contribution of the one or more properties to a cognitive load for a user, the cognitive load corresponding to a measure of complexity of the content and individual expected contributions corresponding to a complexity score;

determining an expected cognitive load associated with the content in dependence upon a weighted combination of individual complexity scores corresponding to the individual expected contributions;

generating an image for display in dependence upon the determined expected cognitive load, the image comprising an indication of a value of the determined expected cognitive load; and causing the image to be presented to the user with a display.

14. A non-transitory machine-readable storage medium which stores computer software which, when executed by a computer, causes the computer to perform a method for evaluating content, the method comprising:

obtaining data relating to one or more properties of the content;

determining an expected contribution of the one or more of the properties to a cognitive load for a user, the cognitive load corresponding to a measure of complexity of the content and individual expected contributions corresponding to a complexity score;

determining an expected cognitive load associated with the content in dependence upon a weighted combination of individual complexity scores corresponding to the individual expected contributions;

generating an image for display in dependence upon the determined expected cognitive load, the image comprising an indication of a value of the determined expected cognitive load; and causing the image to be presented to the user with a display.

* * * * *